W. L. GLENN.
STALK CHOPPER.
APPLICATION FILED AUG. 17, 1916.
1,222,388.
Patented Apr. 10, 1917.
2 SHEETS—SHEET 1.
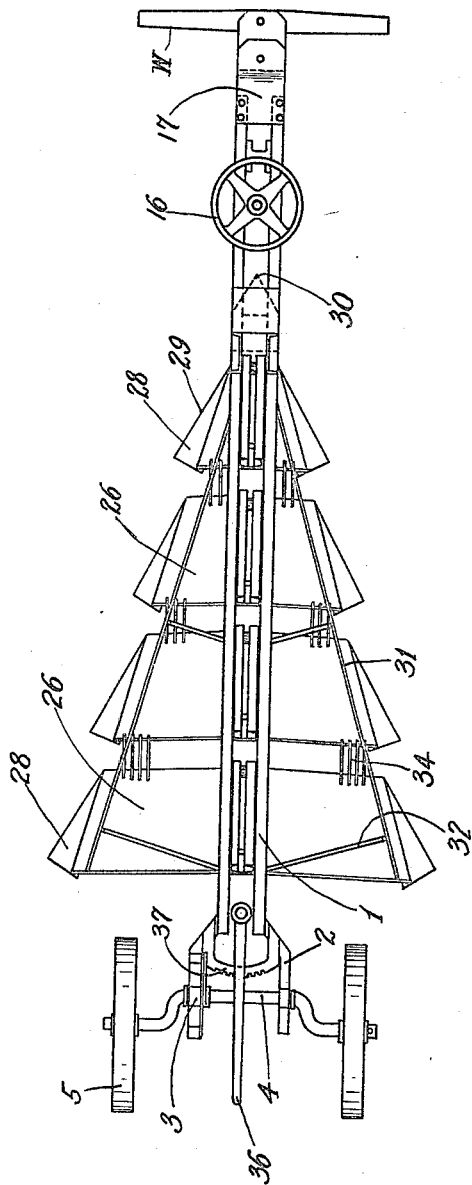
Fig. I
Witnesses
Carney Hartley
Elizabeth Stark
William L. Glenn, Inventor
By Mason Fenwick Lawrence
Attorneys W. L. GLENN.
STALK CHOPPER.
APPLICATION FILED AUG. 17, 1916.
1,222,388.
Patented Apr. 10, 1917.
2 SHEETS—SHEET 2.
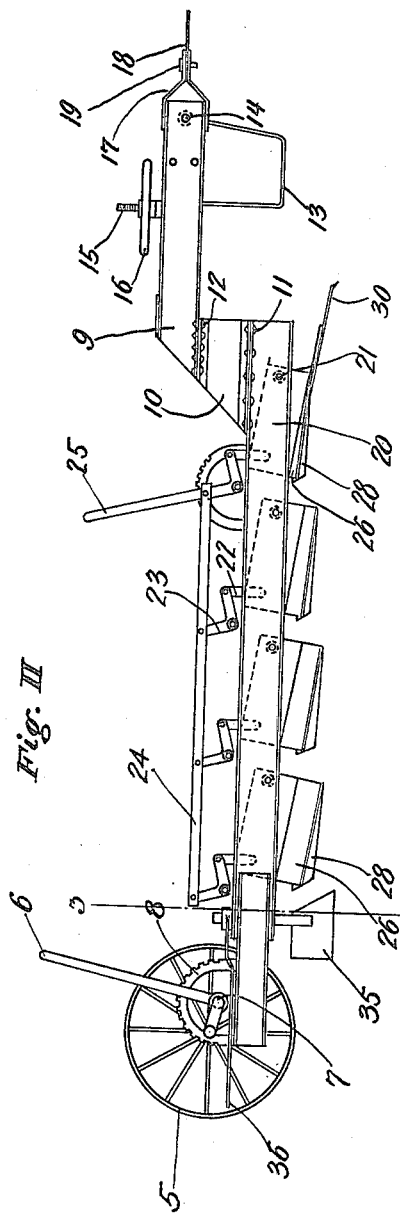
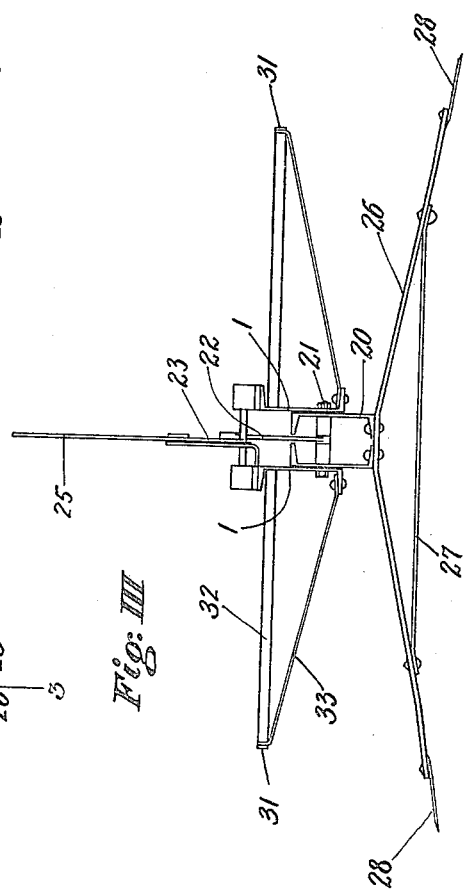

UNITED STATES PATENT OFFICE.

WILLIAM L. GLENN, OF LEBANON, COLORADO.

STALK-CHOPPER.

1,222,388.                  Specification of Letters Patent.    Patented Apr. 10, 1917.

Application filed August 17, 1916. Serial No. 115,477.

*To all whom it may concern:*

Be it known that I, WILLIAM L. GLENN, a citizen of the United States, residing at Lebanon, in the county of Montezuma and State of Colorado, have invented certain new and useful Improvements in Stalk-Choppers; and I do hereby declare the following to be a full, clear, and exact description of the invention, such as will enable others skilled in the art to which it appertains to make and use the same.

This invention relates to stalk choppers, and more especially to those involving a draw cut; and the object of the same is to produce a machine adapted particularly for cutting sagebrush beneath the level of the earth and otherwise clearing land of objectionable growth of a similar nature without furrowing or turning up the land and without turning under the vegetation.

In order to accomplish this object the machine comprises a substantially triangular cutting apparatus made up of a number of sections individually pivoted in the frame, one behind the other, with means for adjusting the angles of the various sections so that their knives will cause the cutting apparatus to draw into the ground slightly; means for sifting out the dirt taken up with such roots as are pulled out of the ground by the knives; means for topping the brush or bushes, or in other words throwing them aside so that they will not become entangled in the machinery or buried in the ground; means at front and rear for adjusting the height of the entire cutting apparatus; and means for permitting the horses or other draft power to break away from the machine in case the latter encounters a serious obstruction and becomes stalled. The invention also contemplates certain details of construction, all of which will be hereinafter more fully described and claimed and are shown in the drawings wherein—

Figure 1 is a plan view of this machine complete, Fig. 2 is a side elevation, and Fig. 3 is a cross section on the line 3—3 of Fig. 2.

The framework of this improved machine is composed of two longitudinal bars or beams 1 diverging at their rear ends as at 2 and pivotally supported at 3 on a bent axle 4 which carries the rear or main wheels 5. A lever 6 is pivoted at 7 on the framework and connected with the axle, and this lever has the usual thumb latch mechanism moving over a toothed sector 8 so that it may be held in adjusted position. Said lever is connected with the bent axle in such manner that by adjusting the lever the height of the main wheels 5 will be adjusted, and when these wheels are depressed the rear end of the framework is raised so that the cutting mechanism carried thereby may be elevated above the ground when the machine is to be drawn from point to point. Also by adjusting the lever in the opposite direction the depth of the cutting mechanism may to an extent be regulated, although usually the cutting blades will travel just a few inches beneath the ground and the angular adjustment of the various sections as described below will be used for this purpose.

The front end of the main framework is continued into a draw bar 9, and if said framework is of two individual beams as shown in Fig. 1 the draw bar may also be of parallel beams spaced from the beams 1 by blocks 10 which are bolted to said beams 1 as at 11 and to the beams 9 as at 12. However, I do not wish to be limited to this detail, as it is quite possible to arch the forward ends of the main beams so as to produce the draw bar beams, or in fact it is possible to make all these beams of wood. Said draw bar is by preference supported by means of a runner or shoe 13 whose front end is connected as at 14 to the draw bar and whose rear end is threaded as at 15 and engaged by a nut having a hand wheel 16. By adjusting the latter the height of the runner or shoe may be adjusted so that the front end of the framework may be raised or lowered to raise or lower the cutting apparatus in a manner already described with respect to the rear end of the framework.

The draft apparatus comprises upper and lower plates 17 attached to the front end of the draw bar, a plate 18 inserted between them, all the plates being provided with holes adapted to register, and a break pin 19 inserted through registering holes for a purpose which will appear. The forward or single plate 18 is attached to the draft mechanism proper which may be a traction engine or a team of horses, and the letter W theoretically indicates a whiffletree which is shown as connected with said plate. In case the machine strikes a serious obstruction so that it becomes stalled, the pin 19 will break, or if it be a bolt it will become sheared off before the cutting mechanism of the machine is broken; and therefore this arrangement provides the draft mechanism with a safety appliance which in times of emergency disconnects the draft from the machine and prevents the injury of either.

The cutting apparatus is substantially triangular in plan view as seen in Fig. 1, and is made up of a number of sections. Each of the latter comprises a short beam 20 pivotally mounted at its front end as at 21 between the main beams 1 and having its rear end connected by means of a link 22 with a crank 23. These cranks are shown of the bell-crank type pivoted at their angles to suitable supports on the main beam, and their upper arms are connected by a rod 24. The latter in turn is connected with a crank handle 25, which may well be an extension of one of the arms of said bell-crank levers, and this lever moves alongside a toothed sector as seen in Fig. 2. Secured to the lower edge of each beam 20 is the center of a slightly arched plate 26 which is by preference maintained in this shape by means of a brace 27 best seen in Fig. 3. The side edges of said plates diverge toward the rear as best seen in Fig. 1, and each edge carries a blade 28 having its cutting edge 29 sharpened; and the cutting edges of the two blades by preference diverge to a slightly greater degree than the edges of the plates. Said blades may be attached to the plates by bolts or other means, so that they can be removed for sharpening and repairs. The foremost beam 20 carries a pointed cutter blade 30 constituting the apex of the triangular cutting apparatus, and as seen in Fig. 1 said apparatus is divided in this way into a number of sections standing one behind the other and each having the front edge or toe of its blade 28 standing in rear of the rear edge or heel of the blade next in front. It results that when this cutting apparatus is drawn through the ground by the superstructure, it cuts a swath as wide as the distance between the heels of the two rearmost blades 28, and all along both edges of the cutting apparatus the treatment of the stalks is by means of a draw cut. In addition to the adjustment of the main wheels and of the shoe or runner 13, adjustment of the cutting apparatus by means of the hand lever 25 raises or lowers the rear ends of the beams 20 and therefore turns them on their pivots 21. The result is that their plates and therefore their blades are canted slightly either upward or downward with respect to a true horizontal line, and if the main adjustment has been such that the front edges of the sections travel say three inches beneath the ground, it is possible to raise their rear edges so that they will travel two inches beneath the ground or to depress the rear edges so that they will travel four inches beneath the ground. However, I find it advantageous always to have the rear edges higher than the front edges because the latter enter the ground first and their tendency should be downward in order to draw the entire machine onto the earth's surface and into working position. When reaching the end of a row it might be possible to cant the sections in the other direction so that their blades will come out of the ground, after which the lever 6 and the hand wheel 16 will be manipulated to raise the entire cutting apparatus as in turning the machine around or driving to another point. When this machine is used for cutting sagebrush and like vegetation with which our Western fields are infected, it is desirable to cut the stalks beneath the surface of the earth, and it is for this purpose that the invention is particularly adapted.

A topper or fender is provided in the shape of two rearwardly diverging rods 31 supported by cross rods 32 and braces 33 as shown, and the purpose of this fender is to throw the tops of the vegetation away from the machine and keep them from falling onto the plates or becoming entangled, or otherwise interfering with the action of the machine. The rods 31 follow in general the outline of the outer edges of the plates 26 as seen in Fig. 1, but by preference they stand a little inside of the outer edges of said plates and therefore inside of the blades 28 and the cutting edges 29 of the latter. In the action of this machine most stalks are cut off beneath the ground as already explained, and the butts of the stalks travel over the blades 28 and onto the plates 26. Meanwhile their tops strike the fender rods, and the latter throw said tops outward onto the ground which drags their butts off the cutting apparatus and leaves the bushes or brush on the ground at each side of the path of the machine. However, it sometimes occurs that the roots of the plants are not very deep or not very well rooted and the cutting edges 29 of the blades drag the roots out of the ground rather than severing the stalks. In this case it will be the roots that travel over the blades 28, and of course they carry considerable dirt with them. In order that this dirt shall not accumulate upon the plates and blades, and gum or muddy the latter, I provide a number of grates made up of a plurality of fingers 34 attached to the rear edge of each plate-section 26 and leading straight back over the front edge of the plate-section in rear; and, after the root has traveled along a blade and plate, it finally passes onto this grate whose fingers are in the line of draft and therefore cause the root to travel straight to the rear while the top is being thrown outward by the fender. This action not only discharges the bush or brush as above described, but sifts the dirt out of the root and drops it through the grate 34 as will be clear. Also the inclination of the plates 26 outward from the central line, as well as their inclination forward in case the sections are tilted as shown in Fig. 2, tends to discharge the dirt delivered thereon by the root or picked up by the knives. Finally, these grates are useful for breaking up lumps of dirt which may be passing over the plates during the progress of the machine through the earth. The dirt which is raised by the plates of the forward section and does not fall off of them, passes along over the forward grating 34 and onto the plates of the next section, part of it is sifted through said grate, and the remainder joins the dirt raised by the plates of the second section; and the operation is repeated throughout all the sections. The result is that the few inches of dirt dug up by this machine is sifted and pulverized, and thus the ground is left with a level mulch well adapted to subsequent planting, while it is clear the brush and the bushes remain on the surface where they can be subsequently gathered up by means of a rake. I might say that should any small bush pass under the fender, and not be thrown off of the machine as above described, it simply travels along to the rear, beneath the rearmost brace rod 33, and drops off of the rearmost section of the cutting apparatus.

Where a field is covered with sagebrush or other vegetation that is rather high, I have noticed a tendency on the part of a team of horses to pass around the bushes, and this of course diverges the machine from a straight line across the field. In order to overcome this tendency as much as possible, I preferably make use of a rudder 35 whose post carries a tiller or lever 36 having a thumb latch mechanism moving over a toothed sector 37. The rudder is in the form of a blade standing on edge and projecting into the soft ground, and by means of the tiller it may be adjusted from time to time to steer the machine the same as the rudder of a boat. Of course if the draft mechanism is mechanical or if the bushes are so small that the team will follow a straight line across the field, this rudder mechanism may be removed; and I do not wish to be limited to its use, nor in fact to its position, as it is quite possible to locate it elsewhere than as shown. Also I do not wish to be limited to the materials and sizes of parts, and if this machine is quite large it may require the services of two attendants, including the driver of the team or motor draft. Obviously the swath treated will be as wide as the distance between the heels of the rearmost blades 28, the depth of the cut will be regulated by setting the hand lever 6 and the hand wheel 16, and the pitch or inclination of the sections and their blades will be regulated by setting the hand lever 25. If the soil be of a light and fluffy nature, this lever may be adjusted so that the blades travel almost in a horizontal line, and yet if it be too light it may be necessary to set the blades so that they will have some little pitch forward in order to draw them downward to their work. I am aware that similar machines have been devised in which the entire triangular cutting apparatus was in one piece, adjustable vertically at front and rear; but in such a structure it is not possible to give the fine adjustment which can be accomplished when the cutting apparatus is divided into sections as shown.

Sagebrush land usually has many mounds or piles of soft dirt and accumulations of decayed vegetable matter. Should a wheel be used to support the front end of my machine it would ride up and down over these mounds, thus making the operation of the machine uneven and inefficient. The shoe 13 tends to scrape aside and level off such mounds or piles and thus tends to maintain the front of the machine at an even height.

What I claim is:

1. In a stalk chopper, the combination with a framework, and means for adjusting the same vertically at front and rear; of a triangular cutting apparatus divided on transverse lines into sections, and means for adjustably supporting said sections beneath the framework.

2. In a stalk chopper, the combination with a framework, and means for adjusting the same vertically at front and rear; of a triangular cutting apparatus divided on transverse lines into sections, each section pivoted at its front end beneath the framework, and means for adjusting its rear end vertically with respect thereto.

3. In a stalk chopper, the combination with a framework, and means for adjusting the same vertically at front and rear; of a triangular cutting apparatus divided on transverse lines into sections, each including a transverse plate and oblique blades along its edges, and means for adjusting the angle of the plates to a horizontal.

4. In a stalk chopper, the combination with a main frame mounted on supports at front and rear; of a cutting apparatus substantially triangular in contour and composed of a series of transverse plates, rearwardly diverging blades along their side edges, a cutting point at the front edge of the foremost plate, means for pivotally supporting the front edge of each plate from the framework, levers connected with the rear edge of each plate, a rod connecting all of the levers, and a hand lever for moving said rod.

5. In a stalk chopper, the combination with a framework and supports for the front and rear ends of said framework; of a series of transverse plates underlying said frame, blades carried by the side edges of said plates and having their cutting edges diverging to the rear, the front end of each blade standing directly in rear of the rear end of the blade next forward, short beams secured to said plates and pivotally mounted at their front ends upon said frame, links rising from the rear ends of said short beams, and lever mechanism for raising or lowering said links at will.

6. In a machine of the class described, the combination with a main framework, and a substantially triangular cutting apparatus made up of transverse plates underlying and supported from said framework and of successively increasing width toward its rear, and blades along their side edges having rearwardly diverging cutting edges; of fender rods overlying said plates and diverging toward the rear, and supports and braces for said rods carried by the framework.

7. In a machine of the class described, the combination with a main framework, and a substantially triangular cutting apparatus made up of transverse plates underlying and supported from said framework and of successively increasing width toward its rear, and blades along their side edges having rearwardly diverging cutting edges; of a grating carried by the rear edge of each plate and composed of fingers projecting straight to the rear over the front edge of the plate next in rear.

8. In a machine of the class described, the combination with a main framework, and a substantially triangular cutting apparatus made up of transverse plates underlying and supported from said framework and of successively increasing width toward its rear, and blades along their side edges having rearwardly diverging cutting edges; of fender rods carried by the framework and diverging to the rear, the rods standing approximately over the outer edges of said plates, and a grating carried by the rear edge of each plate and composed of fingers projecting straight to the rear over the front edge of the plate next in rear.

9. In a machine of the class described, the combination with a framework including a pair of spaced longitudinal beams; of a series of short beams pivoted at their front ends between the main beams, means for adjusting the height of their rear ends, an arched plate beneath each short beam whose center is secured to the beam and whose edges diverge toward the rear of the machine, the front end of each plate being wider than the rear end of the plate next forward, braces secured beneath said plates for sustaining them in arched condition, and blades secured along their outer edges and having their cutting edges inclined to the rear at a greater angle than the edges of the plates.

10. In a stalk chopper, the combination with a framework, a vertically adjustable wheeled support for the rear end of said framework, a shoe pivoted on the framework, of a series of short beams pivoted at their front ends to said frame one behind another, means for raising and lowering their rear ends, a series of transverse plates carried by the short beams, and knives carried by the side edges of the plates with their cutting edges diverging to the rear and the front ends of each pair of knives standing in rear of the rear ends of the pair next forward.

11. In a machine of the class described, a main framework, cutting apparatus comprising transverse sections adjustably and pivotally supported from said framework and including blades having rearwardly diverging cutting edges, and fenders mounted on the framework overlying the blades and diverging toward the rear.

In testimony whereof I affix my signature in presence of two witnesses.

WILLIAM L. GLENN.

Witnesses:
CARL C. TELEBS,
WM. Z. LANCASTER.

Copies of this patent may be obtained for five cents each, by addressing the "Commissioner of Patents, Washington, D. C."